United States Patent [19]

Kapnek

[11] 4,205,470

[45] Jun. 3, 1980

[54] FRAME

[76] Inventor: Bertram H. Kapnek, 8106 Douglas Rd., Philadelphia, Pa. 19118

[21] Appl. No.: 887,104

[22] Filed: Mar. 16, 1978

[51] Int. Cl.² ............................................. G09F 1/12
[52] U.S. Cl. ...................................... 40/155; 52/656; 403/402
[58] Field of Search ...................... 40/152, 152.1, 155, 40/156, 158 R, 158 B, 209; 403/401, 402; 52/656

[56] References Cited

U.S. PATENT DOCUMENTS

| 2,081,722 | 5/1937 | Weinzierl | 40/152 |
| 3,289,341 | 12/1966 | Howell | 40/152 |
| 3,294,429 | 12/1966 | Halip | 40/152 X |
| 3,546,842 | 12/1970 | Blum | 40/155 X |
| 3,698,114 | 10/1972 | Hirsch et al. | 40/155 |
| 3,899,844 | 8/1975 | Munn | 40/156 |

*Primary Examiner*—John F. Pitrelli
*Attorney, Agent, or Firm*—Caesar, Rivise, Bernstein & Cohen, Ltd.

[57] ABSTRACT

A frame construction comprising a plurality of frame members secured together to form a geometric shape, preferably a rectangle. The frame is particularly adapted for framing art work, posters, diplomas, etc. Each frame member has a channel formed in the rear side thereof, and the corners of each member are angled. Two adjacent corners are held in an abutting relationship along the angled corners, to form a complementary angle, such as a 90 degree angle. The frame members are held together by connectors, with each connector having a pair of legs, with one of each legs being received in the channel of one of the frame members. The legs include pointed protuberances that are forced into the walls of the channels to securely hold the frame members together.

7 Claims, 6 Drawing Figures

U.S. Patent   Jun. 3, 1980   4,205,470
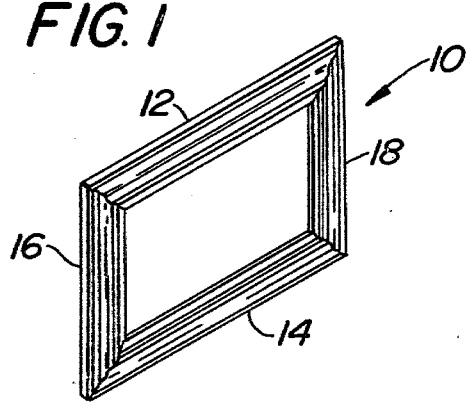
FIG. 1
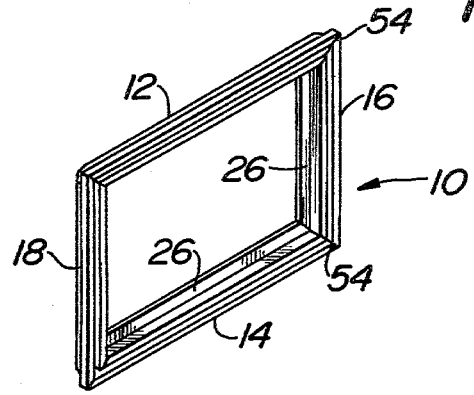
FIG. 2
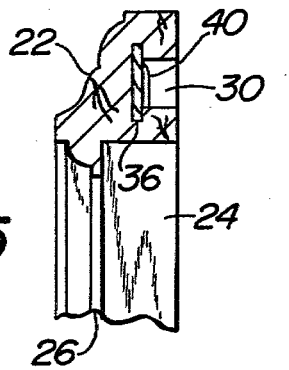
FIG. 5
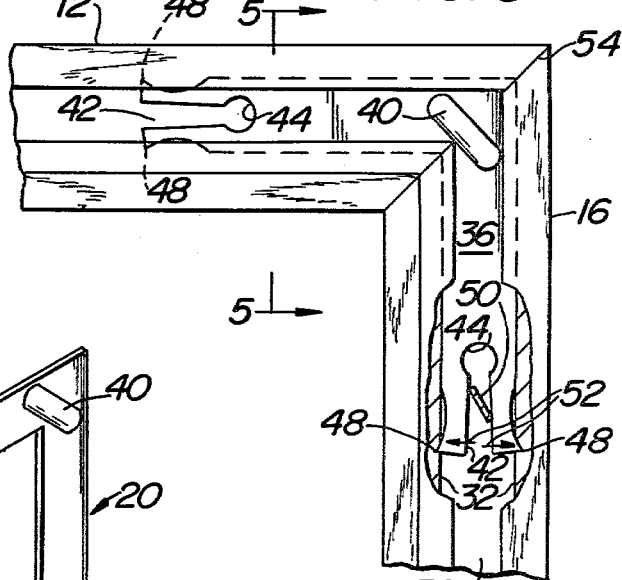
FIG. 3
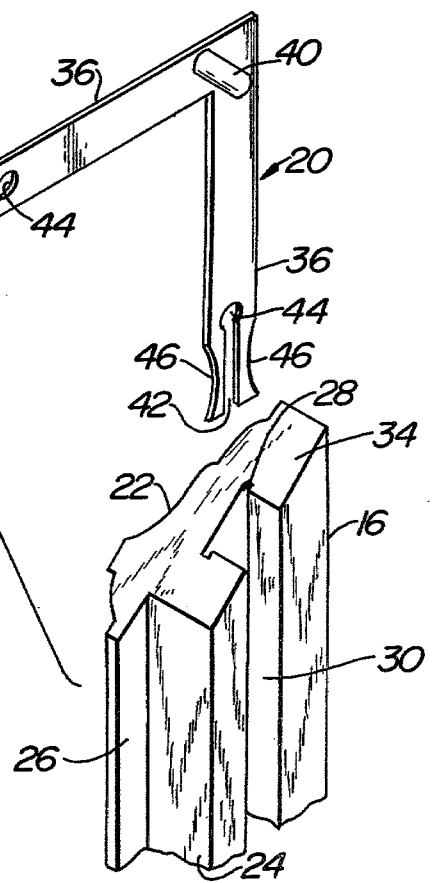
FIG. 6
FIG. 4

FRAME

This invention relates to a frame, and more particularly, to a frame formed from a plurality of members which are held together by connectors.

Whenever it is desired to frame something for display purposes, such as paintings or diplomas, the user of the frame will normally purchase a pre-assembled frame or have the frame custom-made. Generally, the frame members are secured together in right-angle relationships to form a geometrically shaped frame, such as a rectangle. The corners are usually glued together, and on occasion, various fastening means are used to add additional securement for the corners.

The pre-assembled frames or the custom-made frames are usually quite costly, especially in view of the labor involved in forming the framed members into a completed frame. Because of this, many artists or other consumers will make their own frames. This is accomplished by buying frame molding and cutting the frame members to the desired length. In making the cutting, the corners must be mitered so that adjacent frame members can be secured together to form a right angle. The mitering is a tedious process, because measurements and cutting must be exact. Any errors in measurements or cutting will result in a completed frame which is not perfectly square or rectangular. Furthermore, a great deal of effort and time are required to securely glue or otherwise fasten the corners of the frame when assembling the frame members into a completed frame.

The frame of this invention overcomes the problems of the prior art frames which are assembled by an artist or consumer. The frame members are precut to the exact dimensions and all of the mitered corners are perfectly cut to a 45 degree angle. Connectors are provided for the frame members whereby the frame can be assembled easily, without the use of any adhesive.

The frame components of this invention can be provided in a single kit which can be assembled by the user in a matter of minutes. Alternatively, the molding forming the frame members can be sold in strip form, which can subsequently be cut by the user. However, because special connectors are provided for forming the frame from the frame members, there are no problems involved with gluing the corners of the frame or in otherwise securing them through fasteners which must be hammered into place, thereby possibly resulting in damage to the completed frame.

It is accordingly an object of this invention to provide a novel frame.

It is another object of this invention to provide a framing kit comprising frame members and connectors which are easily formed into a completed frame, without the necessity of utilizing any adhesive.

It is a further object of this invention to provide a method of forming a frame.

These and other objects of this invention are accomplished by providing a frame comprising a plurality of frame members, said frame members having ends which are cut at an angle, with two abutting frame members being joined at their angular faces to form a complementary angle, and a connector for securing the two frame members together at said complementary angle, said connector comprising a pair of legs, said legs projecting from each other at said complementary angle, with one of each of said legs being received in a channel of one of each of said frame members, and said legs having points thereon which project through the walls of said channels and into said frame members to securely hold said frame members together.

Other objects and many of the attendant advantages of this invention will be readily appreciated as the same becomes better understood by reference to the following detailed description when considered in connection with the accompanying drawings wherein:

FIG. 1 is a front perspective view of the frame of this invention;

FIG. 2 is a rear perspective view of the frame of this invention;

FIG. 3 is a rear elevational view, partially broken away, of one corner of the frame of FIG. 1;

FIG. 4 is a rear elevational view of a frame member of the frame of FIG. 1, and showing one step in the assembly process of the frame;

FIG. 5 is a sectional view taken along the line 5—5 of FIG. 3; and

FIG. 6 is an exploded perspective view showing the connector and a frame member of the frame of this invention.

Referring now in greater detail to the various figures of the drawings wherein like reference characters refer to like parts, a frame embodying the present invention is generally shown at 10 in FIGS. 1 and 2. Frame 10 comprises frame members 12, 14, 16 and 18 and a connector, generally shown at 20 in FIG. 6, connecting each adjacent pair of frame members.

Referring to FIG. 6, frame member 16 is shown in perspective. The structure of member 16 is exemplary of all of the other frame members. The front face of the frame member is scalloped, as shown at 22. The scalloping is conventional in moldings made into frames. The rear of the frame member includes an inner wall 24. A lip 26 projects perpendicularly to wall 24. A T-shaped channel comprising a head 28 and a leg 30 is formed in the rear of member 16 and extends for the length of the member. Head 28 includes side walls 32 (FIGS. 3 and 4). The ends of each frame member are cut at a 45 degree angle with respect to the length of the frame member, as shown at 34 in FIG. 6.

The connector 20 is best seen in FIG. 6. As seen therein, the connector is formed from flat metal and comprises a pair of legs 36 which project perpendicularly to each other. A depression 40 is formed at the intersection of the two legs and serves to rigidify the connector at the intersection. A longitudinally extending slot 42 is formed at the end of each leg 36. Each slot 42 terminates in an enlarged relief hole 44, the width or diameter of which is greater than the width of the slot 42. An arcuate cut 46 is made in each outer edge of each leg 36, adjacent slot 42. The ends of each leg 36 terminate in points or cutting edges 48.

The frame is assembled by sliding one leg 36 of connector 20 longitudinally into head 28 of the T-shaped channel of a frame member. As seen in FIG. 4, the leg 36 has a width which is substantially equal to the width of the head 28 of the T-shaped groove or channel, and abuts the walls 32 of the head 28. After the leg 36 is pushed to the greatest depth possible within the groove, a blade 50 (FIG. 3), such as the blade of a screwdriver, is inserted in slot 42 of leg 36. The blade 50 is then twisted, thereby forcing the lower extremities of the leg 36 outward, as shown by arrows 52 in FIG. 3. This causes the points 48 to penetrate the walls 32 of the frame section, thereby securing the leg 36 within the frame section. Having the relief hole 44 and arcuate edges 46 permits the deformation of the lower ends of the leg 36 so that these ends can easily penetrate the walls of the frame section.

After one leg 36 of connector 20 has been inserted in a frame member, such as frame member 16, the adjacent frame member, such as frame member 12, is then slid over the other leg 36 by engaging the leg within head 28 of the T-shaped groove or channel. The frame member 12 is then slid along the leg 36 until its cut end 34 abuts the cut end 34 on member 16. When the two cut ends are in abutment, as shown by abutment line 54 in FIG. 3, the angled faces complement each other to form a 90 degree angle. After the frame section 12 is in the position shown in FIG. 3, a blade 50 is inserted in slot 42 of leg 36 and rotated, in the same manner as described above. This forces the points 48 of the other leg 36 into the walls of the T-shaped groove.

In a similar manner, frame members 14 and 18 are connected to the adjacent frame members by connectors 20.

It is thus seen that the frame of this invention is easily assembled without the necessity of any cutting of frame members or without the necessity of using any adhesive. All that is necessary to form the frame from its components is a simple screwdriver. The complete frame can be assembled in a matter of minutes.

The entire frame can be sold as a kit comprising the four frame members and the four connectors. Since the frame is sold in a knock-down condition, it can easily be packed and stored without consuming a substantial amount of space. No particular skill is needed in assembling the frame, since the connector legs 36 will easily slide into the grooves in the frame sections, and the legs can easily be parted at the slots 42 by twisting the screwdriver blade.

The connector 20 is easily formed by stamping it from a metal sheet. Any deformable metal can be used in making the connector, such as steel or aluminum. The relief hole 44 and the arcuate cuts 46 permit the easy deformation of the ends of the connector for securement of the points 48 in the walls of the T-shaped groove in the frame member. This is readily apparent in the broken-away portion of FIG. 3. Prior to the deformation of the ends of the legs 36 of the connector, the legs will easily slide into the head 28 of the T-shaped groove, as is apparent from FIGS. 4 and 5. This permits the ready assembly of the complete frame.

The frame members 12, 14, 16 and 18 can be formed from any material that is easily penetrated by the points 48. Normally, the frame members will be formed from wood. In the forming process, conventional frame molding can be used, and the T-shaped groove formed by head section 28 and leg section 30 can be formed by a conventional router. Alternatively, the frame members can be formed from deformable plastic, such as polyurethane. These frame members can either be molded or formed by an extrusion process.

Instead of furnishing the frame-forming components of this invention as a kit, alternatively the connectors can be sold separately, with the consumer also purchasing the frame members in the form of a continuous strip of molding. Thereafter, the user can cut the molding to the desired size to form the completed frame.

The frame members of this invention can be prefinished in any manner known to the art, such as staining, varnishing or painting. Alternatively, the finishing of the frame members can be by the purchaser of the same.

The painting or other document to be framed can be placed in frame 10 in the same manner as is done with conventional frames. Thus, the painting is inserted from the rear of the frame against the lip 26. It can therefore be secured in place by conventional fastening elements, such as brads.

Without further elaboration, the foregoing will so fully illustrate my invention, that others may, by applying current or future knowledge, readily adapt the same for use under various conditions of service.

What is claimed as the invention is:

1. A frame comprising a plurality of frame members, each of said frame members being formed from a deformable material, said material being selected from the group consisting of wood and plastic, said frame members having ends which are angled, with each two abutting frame members being joined at their angled ends to form a complementary angle, each of said frame members having a longitudinally extending channel formed therein, and a connector for securing the two frame members together at said complementary angle, said connector comprising a pair of legs, said legs projecting from each other at said complementary angle, said legs lying in the same plane, with one of said legs being received in the channel of each of said frame members, said legs having points thereon which project through the walls of said channels and into said frame members to securely hold said frame members together at said complementary angle, each of said legs having a width which is less than the width of said channels, said points being spaced a distance greater than said width, whereby said points project into said walls, said points being on opposite sides of a slot formed in each of said legs, whereby said points project outwardly from said legs by expansion away from said slots, a relief opening at the inner end of each of said slots, said relief opening having a width which is greater than the width of its associated slot, and an arcuate recess in each of said legs adjacent each of said points.

2. The frame of claim 1 and further including a lip on each of said frame members, said lip serving to confine the item being framed within said frame.

3. The frame of claim 1 and further including a depression formed at the intersection of said legs, said depression serving to rigidify the connector at the intersection.

4. A kit for forming a frame comprising a plurality of frame members and a plurality of connectors, with the number of frame members equaling the number of connectors, each of said frame members being formed from a deformable material, said material being selected from the group consisting of wood and plastic, each of said frame members having a longitudinally extending channel formed therein, each of said frame members having an angular end, whereby the abutment of two of said frame members will form a complementary angle, each of said connectors comprising a pair of legs, with said legs projecting from each other at said complementary angle, said legs lying in the same plane, each of said legs having a width which is slightly less than the width of said channel, whereby said legs may be slid into said channel for connecting a pair of abutting frame members, each of said legs having a slot formed in end thereof, with a pair of piercing points being on the outer edge of each leg and in the area of said slot, said connectors being formed from a deformable metal, whereby the deformation of the leg at said slot forces said piercing points outwardly so that said points can be engaged in the wall of one of said frame members, each of said connectors including a relief opening at the end of each of said slots, said relief opening having a width which is greater than the width of its associated slot, and an arcuate recess in each of said legs adjacent each of said piercing points.

5. The kit of claim 4 wherein each of said frame members has a lip thereon, said lip serving to confine an item being framed when said kit is completed into a frame.

6. The kit of claim 4 wherein the legs on each of said connectors project at a 90 degree angle with respect to each other.

7. The kit of claim 4 and further including a depression formed at the intersection of said legs, said depression serving to rigidify the connector at the intersection.

* * * * *